US012489203B2

(12) United States Patent
Yamakawa

(10) Patent No.: US 12,489,203 B2
(45) Date of Patent: Dec. 2, 2025

(54) ANTENNA MODULE AND COMMUNICATION DEVICE INCLUDING THE SAME

(71) Applicant: Murata Manufacturing Co., Ltd., Kyoto (JP)

(72) Inventor: Yuri Yamakawa, Kyoto (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 198 days.

(21) Appl. No.: 18/337,432

(22) Filed: Jun. 20, 2023

(65) Prior Publication Data

US 2023/0352824 A1 Nov. 2, 2023

Related U.S. Application Data

(63) Continuation of application No. PCT/JP2021/044261, filed on Dec. 2, 2021.

(30) Foreign Application Priority Data

Dec. 23, 2020 (JP) ................................ 2020-213397

(51) Int. Cl.
*H01Q 1/38* (2006.01)
*H01Q 1/22* (2006.01)
(Continued)

(52) U.S. Cl.
CPC ............ *H01Q 1/38* (2013.01); *H01Q 1/2283* (2013.01); *H01Q 1/48* (2013.01); *H01Q 1/50* (2013.01); *H01Q 5/378* (2015.01)

(58) Field of Classification Search
CPC .......... H01Q 1/38; H01Q 1/2283; H01Q 1/48; H01Q 1/50; H01Q 5/378; H01Q 1/40; H01Q 9/0414; H01Q 21/08; H01Q 21/24
See application file for complete search history.

(56) References Cited

U.S. PATENT DOCUMENTS 11,527,816 B2 * 12/2022 Sudo .................... H01Q 9/0414
2020/0119453 A1 * 4/2020 Takayama .............. H01Q 1/243

FOREIGN PATENT DOCUMENTS

JP 2003-158410 A 5/2003
JP 6798656 B1 12/2020
(Continued)

OTHER PUBLICATIONS

International Search Report and Written Opinion mailed on Feb. 15, 2022, received for PCT Application PCT/JP2021/044261, filed on Dec. 2, 2021, 11 pages including English Translation.

*Primary Examiner* — Seung H Lee
(74) *Attorney, Agent, or Firm* — XSENSUS LLP

(57) ABSTRACT

An antenna module includes a dielectric substrate, a radiating element, and grounding electrodes. The dielectric substrate has a first surface facing a second surface, and includes a plate-shaped first portion and a plate-shaped second portion which has a thickness less than that of the first portion. The radiating element is disposed in the first portion. The grounding electrode is disposed in the first portion at a position, which is located apart from the radiating element in the direction from the radiating element to the second surface, so as to face the radiating element. The grounding electrode is disposed between the first surface and the second surface in the second portion, and is electrically connected to the grounding electrode. The second surface in an area of the second portion includes a recess disposed at an end of the first dielectric substrate.

19 Claims, 12 Drawing Sheets

(51) Int. Cl.
*H01Q 1/48* (2006.01)
*H01Q 1/50* (2006.01)
*H01Q 5/378* (2015.01)

(56) References Cited

FOREIGN PATENT DOCUMENTS

| | | | | | |
|---|---|---|---|---|---|
| WO | 2012/165336 | A1 | | 12/2012 | |
| WO | 2018/230475 | A1 | | 12/2018 | |
| WO | 2019/026595 | A1 | | 2/2019 | |
| WO | WO-2020031876 | A1 | * | 2/2020 | ........... H01Q 1/2283 |
| WO | WO-2020149138 | A1 | * | 7/2020 | ............. H01Q 1/243 |

* cited by examiner

ANTENNA MODULE AND COMMUNICATION DEVICE INCLUDING THE SAME

CROSS-REFERENCE TO RELATED APPLICATIONS

This application is a continuation of, and claims priority to, international application no. PCT/JP2021/044261, filed Dec. 2, 2021, which claims priority to Japanese patent application no. 2020-213397, filed Dec. 23, 2020. The contents of all prior applications are hereby incorporated by reference in their entirety.

TECHNICAL FIELD

The present disclosure relates to an antenna module and a communication device including the antenna module, and a technique for preventing deformation of an antenna module and improving characteristics of the antenna module.

BACKGROUND ART

International Publication No. 2019/026595 (Patent Document 1) describes an antenna module in which a plate-shaped radiation electrode is disposed on the front surface side of a dielectric substrate and in which an RFIC is disposed on the back surface side.

CITATION LIST

Patent Document

Patent Document 1: International Publication No. 2019/026595

SUMMARY

Technical Problem

In the antenna module described above, a plate-shaped grounding electrode may be disposed across the entire area on the back surface side of the dielectric substrate. Typically, a dielectric substrate is shaped like a plate. If the width dimension of a cross section of the dielectric substrate is large relative to the thickness of the dielectric substrate, the difference in thermal contraction between the front surface and the back surface of the substrate in heating and cooling processes in forming the substrate increases the difference in thermal stress, which may cause the dielectric substrate to be warped.

In contrast, when the width dimension of the dielectric substrate is made small, although occurrence of warping of the dielectric substrate is suppressed, the area of the grounding electrode is made small relative to the radiation electrode, and a small amount of electric flux occurs between the radiation electrode and the grounding electrode. This may lead to a reduction of the gain of the antenna module.

An aspect of the present disclosure is to solve such an issue. Thus, aspects of the present disclosure prevent occurrence of warping of a dielectric substrate in an antenna module while a reduction of the antenna gain is suppressed.

Solution to Problem

An exemplary antenna module includes a first dielectric substrate, a first radiating element, a first grounding electrode, and a second grounding electrode. The first dielectric substrate has a first surface facing a second surface. The first dielectric substrate includes a first portion and a second portion. The first portion and the second portion are both plate-shaped. The second portion has a thickness less than that of the first portion. The first radiating element is included in the first portion. The first grounding electrode is disposed in the first portion at a position, which is located apart from the first radiating element in the direction from the first radiating element to the second surface, so as to face the first radiating element. The second grounding electrode is disposed between the first surface and the second surface in the second portion and is electrically connected to the first grounding electrode. The second surface in an area of the second portion includes a recess disposed at an end of the first dielectric substrate.

Exemplary Advantageous Effects

In the antenna module provided by the present disclosure, the dielectric substrate has the first portion and the second portion which have different thicknesses. The radiating element is disposed in the first portion which is relatively thick. The grounding electrode (second grounding electrode) in the second portion which is relatively thin is disposed in an inner layer between the front surface (first surface) and the back surface (second surface) of the second portion. Such a configuration enables the area of the grounding electrodes to be made large relative to that of the radiating element, achieving suppression of a reduction of the antenna gain. Further, the dielectric substrate in the second portion, in which the radiating element is not disposed, is thin, achieving prevention of occurrence of warping of the dielectric substrate.

DESCRIPTION OF EMBODIMENTS

Figure 1:
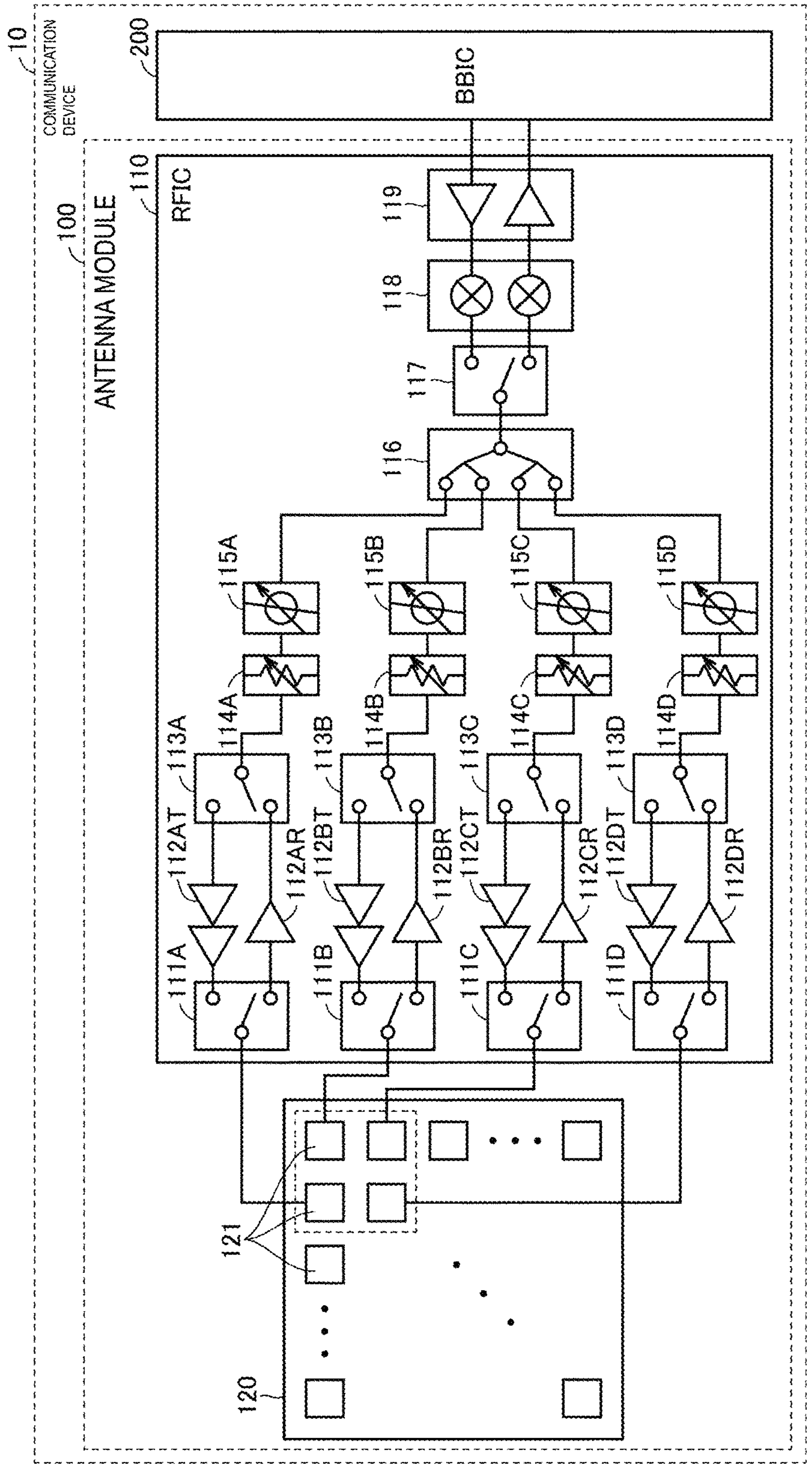
FIG. 1 is a block diagram illustrating a communication device according to a first exemplary embodiment.

Exemplary embodiments of the present disclosure will be described below in detail by referring to the drawings. Identical parts or corresponding parts in the figures are designated with identical reference numerals, and repeated description will be avoided.

First Embodiment (The Basic Configuration of a Communication Device)

FIG. 1 is an exemplary block diagram illustrating a communication device 10 according to the exemplary embodiment. The communication device 10 is, for example, a portable terminal, such as a cellular phone, a smartphone, or a tablet, a personal computer provided with a communication function, or a base station. Examples of the frequency band of radio waves used in an antenna module 100 according to the exemplary embodiment include millimeter-wave bands having the center frequencies, for example, of 28 GHz, 39 GHz, and 60 GHz. Alternatively, the antenna module 100 may be applied to radio waves in a frequency band other than those described above.

Referring to FIG. 1, the communication device 10 includes the antenna module 100 and a base band integrated circuit (BBIC) 200 configured as a baseband signal processing circuit. The antenna module 100 includes a radio frequency integrated circuit (RFIC 110), which is an exemplary feed circuit, and an antenna device 120. The communication device 10 upconverts signals, which are transported from the BBIC 200 to the antenna module 100, to radio-frequency signals, and radiates the resulting signals from the antenna device 120. In addition, the communication device 10 downconverts radio-frequency signals, which are received at the antenna device 120, and processes the signals in the BBIC 200.

For ease of description, FIG. 1 illustrates only the configuration corresponding to four radiating elements 121 among multiple radiating elements 121 included in the antenna device 120, and does not illustrate the configuration corresponding the other radiating elements 121 having substantially the same configuration. FIG. 1 illustrates an example in which the antenna device 120 is formed by using multiple radiating elements 121 arranged in a two-dimensional array. However, multiple radiating elements 121 are not always necessary; the antenna device 120 may be formed by using a single radiating element 121. In addition, the antenna device 120 may have a one-dimensional array in which multiple radiating elements 121 are arranged in a line. In the exemplary embodiment, an example in which each of the radiating elements 121 is a substantially-square, plate-shaped patch antenna will be described. Alternatively, each radiating element 121 may be circular or oval, or may have another polygonal shape such as a hexagon.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner/splitter 116, a mixer 118, and an amplifier circuit 119.

In transmission of radio-frequency signals, the switches 111A to 111D and 113A to 113D are switched to the power amplifiers 112AT to 112DT side; the switch 117 is connected to the transmit-side amplifier of the amplifier circuit 119. In reception of radio-frequency signals, the switches 111A to 111D and 113A to 113D are switched to the low-noise amplifiers 112AR to 112DR side; the switch 117 is connected to the receive-side amplifier of the amplifier circuit 119.

Signals transported from the BBIC 200 are amplified by the amplifier circuit 119, and are upconverted by the mixer 118. The transmit signals, which are radio-frequency signals obtained through the upconverting, are split by the signal combiner/splitter 116 into four. The four signals pass through four signal paths and are fed to corresponding radiating elements 121 different from each other. At that time, the degrees of phase shifts of the phase shifters 115A to 115D disposed on the respective signal paths are individually adjusted, enabling the directivity of the antenna device 120 to be adjusted. In addition, the attenuators 114A to 114D adjust the strengths of the transmit signals.

Receive signals, which are radio-frequency signals received by corresponding radiating elements 121, pass through four corresponding signal paths different from each other, and are combined by the signal combiner/splitter 116 into a single signal. The combined receive signal is downconverted by the mixer 118 and is amplified by the amplifier circuit 119. The amplified signal is transported to the BBIC 200.

The RFIC 110 is formed, for example, as a single-chip integrated-circuit component including the circuit configuration described above. Alternatively, the devices (the switches, the power amplifier, the low-noise amplifier, the attenuator, and the phase shifter), corresponding to each radiating element 121, in the RFIC 110 may be formed as a single-chip integrated-circuit component corresponding to the radiating element 121.

(The Configuration of the Antenna Module)

Figure 2:
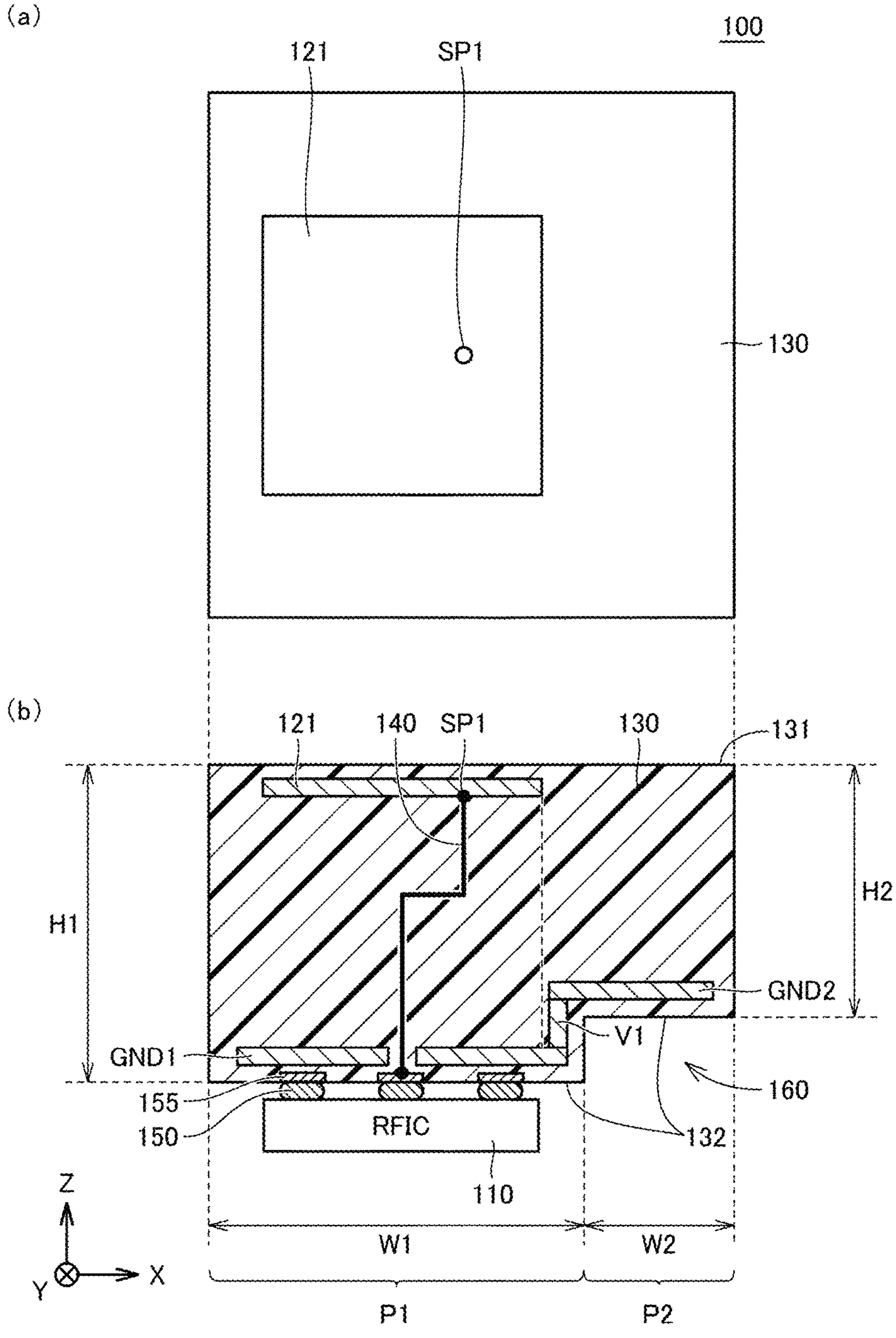
FIG. 2 includes a cross-sectional perspective view and a plan view of an antenna module of the communication device in FIG. 1.

FIG. 2 includes a plan view (FIG. 2(*a*)) and a cross-sectional perspective view (FIG. 2(*b*)) of the antenna module 100 in the communication device 10 in FIG. 1. Referring to FIG. 2, the antenna module 100 includes, in addition to a radiating element 121 and the RFIC 110, a dielectric substrate 130, a feed wire 140, and grounding electrodes GND1 and GND2. In the description below, the positive direction of Z axis in each figure may be referred to as the top-surface side; the negative direction may be referred to as the bottom-surface side.

The dielectric substrate 130 is, for example, an LTCC (Low Temperature Co-fired Ceramics) multilayer substrate, a multilayer resin substrate which is formed by laminating multiple resin layers formed of resin, such as epoxy or polyimide, a multilayer resin substrate which is formed by laminating multiple resin layers formed of LCP (Liquid Crystal Polymer) having a lower dielectric constant, a multilayer resin substrate formed by laminating multiple resin layers formed of fluorocarbon resin, a multilayer resin substrate formed by laminating multiple resin layers formed of a PET (Polyethylene Terephthalate) member, or a multilayer ceramic substrate other than an LTCC. The dielectric substrate 130 does not necessarily have a multilayer structure, and may have a single-layer substrate.

As illustrated in FIG. 2(*b*), the dielectric substrate 130 according to the first embodiment includes a first portion P1 having a thickness H1, and a second portion P2 having a thickness H2 less than H1 (H1>H2). In the dielectric substrate 130, the top surface of the second portion P2 is located at the same level as the top surface of the first portion P1; the bottom surface of the second portion P2 is located higher than the bottom surface of the first portion. Therefore, the second portion P2 has a recess 160 formed on the bottom-surface side of the dielectric substrate 130. The direction from the first portion P1 to the second portion P2 (that is, the X-axis direction in FIG. 2) is referred to as a first direction. The width W1, in the first direction, of the first portion P1 is greater than the width W2, in the first direction, of the second portion P2 (W1>W2).

The dielectric substrate 130 is substantially rectangular in plan view in the normal direction (the Z-axis direction). The radiating element 121 is disposed on the top surface 131 side (the side in the positive direction of the Z axis) of the first portion P1. The grounding electrode GND1 is disposed on the bottom surface 132 side of the first portion P1 so as to face the radiating element 121. Alternatively, the radiating element 121 may be exposed on the top surface 131 of the dielectric substrate 130, or may be disposed near the top surface 131 in an inner layer of the dielectric substrate 130 as in the example in FIG. 2. Connection terminals 155 for connection with an external device are disposed on the bottom surface 132 of the first portion P1. The RFIC 110 is connected to the connection terminals 155 with solder bumps 150 interposed in between.

The grounding electrode GND2 is disposed between the top surface 131 and the bottom surface 132 of the second portion P2 of the dielectric substrate 130. The grounding electrode GND2 is electrically connected to the grounding electrode GND1 through a via V1 formed of a conductive member, such as copper or aluminum. When the dielectric substrate 130 is viewed in plan in the normal direction, the grounding electrode GND2 is disposed so as not to overlap the radiating element 121.

The feed wire 140, which extends through the grounding electrode GND1 from the RFIC 110, is connected to a feed point SP1 of the radiating element 121. Radio-frequency signals are transported from the RFIC 110 through the feed wire 140 to the radiating element 121. When the radiating element 121 is viewed in plan in the normal direction (the Z-axis direction), the feed point SP1 is disposed at a position offset from the center of the radiating element 121 in the positive direction of the X axis. Supply of radio-frequency signals to the feed point SP1 causes radio waves, whose polarization direction is the X-axis direction, to be radiated from the radiating element 121.

Figure 3:
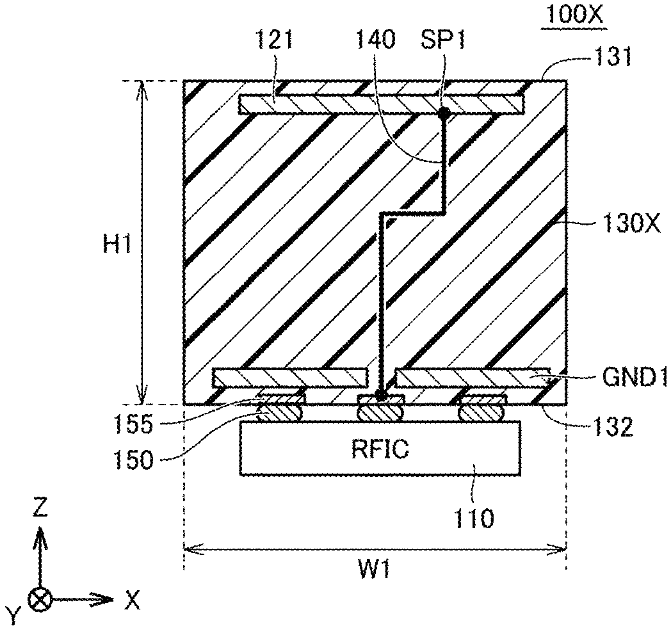
FIG. 3 is a cross-sectional perspective view of an antenna module according to a first comparison example.
Figure 4:
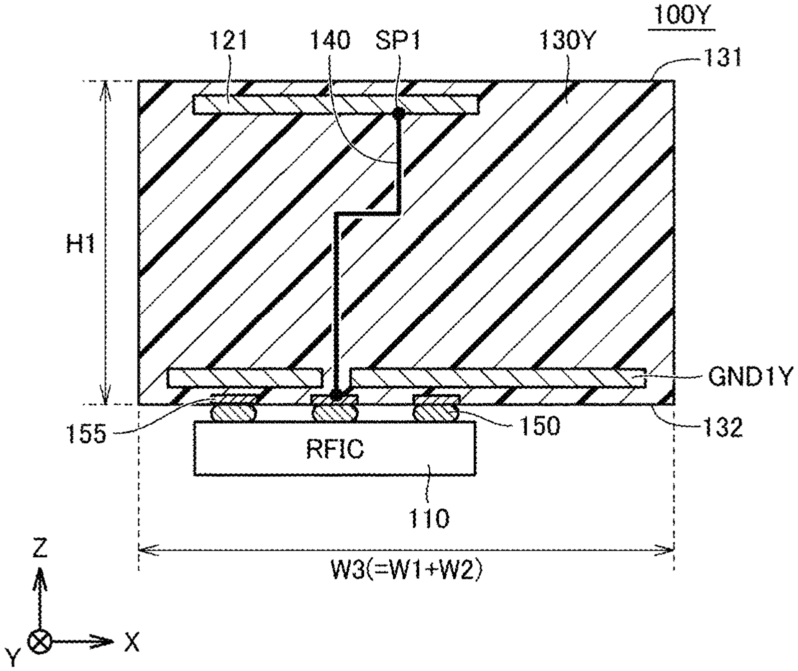
FIG. 4 is a cross-sectional perspective view of an antenna module according to a second comparison example.

A feature of the antenna module 100 according to the first exemplary embodiment will be described by using comparison examples in FIGS. 3 and 4. FIG. 3 is a cross-sectional perspective view of an antenna module 100X according to a first comparison example. FIG. 4 is a cross-sectional perspective view of an antenna module 100Y according to a second comparison example. Both dielectric substrates 130X and 130Y according to the comparison examples are shaped like a plate having the even thickness H1.

The first comparison example is an example in which the dimension, in the X-axis direction, of the dielectric substrate 130X is set to the dimension W1 which is the same as that of the first portion P1 of the antenna module 100. The second comparison example is an example in which the dimension, in the X-axis direction, of the dielectric substrate 130Y is set to a dimension W3(=W1+W2) which is the same as that, in the X-axis direction, of the antenna module 100. The grounding electrode GND1Y in the second comparison example is disposed at the same position in the thickness direction across the entirety of the dielectric substrate 130Y.

As in the antenna module 100Y in the second comparison example, a grounding electrode GND1Y is disposed uniformly in the dielectric substrate 130Y having a larger size than the radiating element 121. In such a case, the difference between the thermal expansion coefficient of the dielectric and that of the grounding electrode GND1Y may cause a difference in thermal stress in heating and cooling processes in forming the dielectric substrate 130Y, resulting in occurrence of warping of the dielectric substrate 130Y. The warping may cause difficulty in mounting the RFIC 110, or may affect the characteristics, such as the frequency band and the directivity of radio waves which are to be radiated.

As in the antenna module 100X in the first comparison example in FIG. 3, the dimension, in the X-axis direction, of the dielectric substrate 130X is made small. In such a case, the difference between the conductor ratio on the top-surface side and that on the bottom-surface side of the dielectric substrate may be reduced, resulting in suppression of occurrence of warping of the dielectric substrate as in the second comparison example. However, the area of the grounding electrode GND1 is made small, resulting in a small amount of electric flux which occurs between the radiating element 121 and the grounding electrode GND1. This may lead to a reduction of the gain of the antenna module. That is, the size of a dielectric substrate has a tradeoff relationship between warping of the dielectric substrate and antenna gain.

In the antenna module 100 according to the first exemplary embodiment, the radiating element 121 and the grounding electrode GND1 are disposed in the first portion P1, which is relatively thick, of the dielectric substrate 130. The grounding electrode GND2, which is connected electrically to the grounding electrode GND1, is disposed in the inner layer in the second portion P2, which is relatively thin, of the dielectric substrate 130. Thus, the second portion P2, in which the radiating element 121 is not disposed, of the dielectric substrate is formed so as to be thin, preventing occurrence of warping of the dielectric substrate 130. Further, the area of the entire grounding electrodes may be made large relative to that of the radiating element 121, achieving suppression of a reduction of the antenna gain.

In an actual antenna module, a current distribution occurs also in a grounding electrode, and not a small amount of current flows even in the grounding electrode. Thus, some radio waves may be radiated, not only from a radiating element, but also from the grounding electrode. Therefore, the area of the grounding electrode, which is made large relative to that of the radiating element 121, also achieves a wider frequency bandwidth of radio waves that are to be radiated.

"Top surface 131" and "bottom surface 132" in the first exemplary embodiment correspond to "first surface" and "second surface", respectively, in the present disclosure. "Radiating element 121" in the first exemplary embodiment corresponds to "first radiating element" in the present disclosure. "Grounding electrode GND1" and "grounding electrode GND2" in the first exemplary embodiment correspond to "first grounding electrode" and "second grounding electrode", respectively, in the present disclosure.

First Modified Example

In the antenna module 100 according to the first exemplary embodiment, the configuration in which the grounding electrode GND1 in the first portion P1 and the grounding electrode GND2 in the second portion P2 are disposed in the dielectric substrate 130 at different positions in the thickness direction is described.

Figure 5:
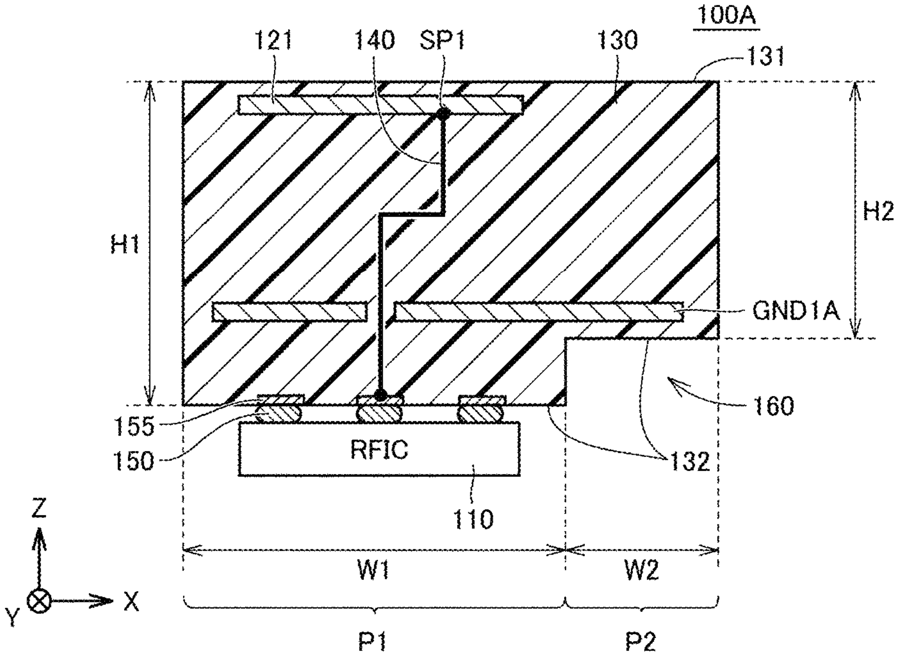
FIG. 5 is a cross-sectional perspective view of an antenna module according to a first modified example.

In an antenna module 100A according to a first modified example illustrated in FIG. 5, a grounding electrode GND1A in the first portion P1 and the second portion P2 is disposed at the same position, in the thickness direction, of the dielectric substrate 130. Also in this configuration, the recess 160 is formed on the bottom-surface side of the second portion P2 of the dielectric substrate 130, preventing occurrence of warping in forming the dielectric substrate 130. In addition, the area of the grounding electrode GND1A may be made large relative to that of the radiating element 121, achieving suppression of a reduction of the antenna gain and achieving a wider frequency bandwidth.

Second Modified Example

In the antenna module 100 according to the first exemplary embodiment, when the dielectric substrate 130 is viewed in plan in the normal direction, the grounding electrode GND2 in the second portion P2 is disposed so as not to overlap the radiating element 121. However, the grounding electrode in the second portion P2 may overlap the radiating element 121 partially.

Figure 6:
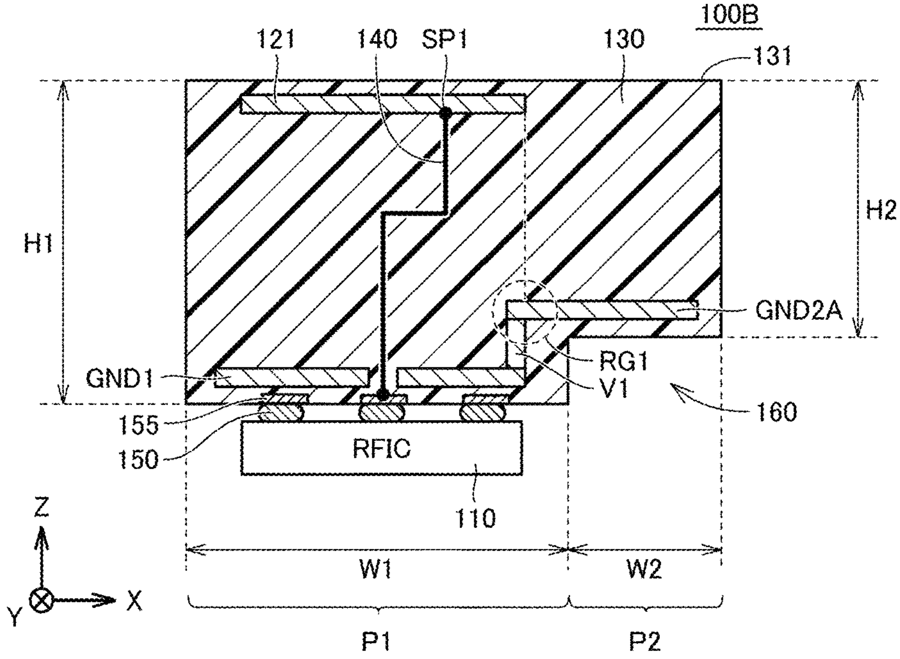
FIG. 6 is a cross-sectional perspective view of an antenna module according to a second modified example.

FIG. 6 is a cross-sectional perspective view of an antenna module 100B according to a second modified example. As illustrated in a portion RG1 in FIG. 6, in the antenna module 100B, when the dielectric substrate 130 is viewed in plan in the normal direction, a grounding electrode GND2A in the second portion P2 is disposed so that an end portion of the grounding electrode GND2A overlaps the radiating element 121 partially.

In the antenna module 100B, the area of the overlapping portion between the radiating element 121 and the grounding electrode GND1 in viewing the dielectric substrate 130 in plan in the normal direction is smaller than that of the antenna module 100 according to the first exemplary embodiment. Therefore, compared with the antenna module 100, the antenna characteristics such as antenna gain slightly degrade. However, like the antenna module 100, the recess 160 is formed on the bottom-surface side of the second portion P2 of the dielectric substrate 130. In addition, the area of the entire grounding electrodes may be ensured relative to that of the radiating element 121. Thus, compared with the compared examples, occurrence of warping of the dielectric substrate 130 is prevented, while suppression of a reduction of the antenna gain is achieved.

(Comparison of Gain Characteristics)

Figure 7:
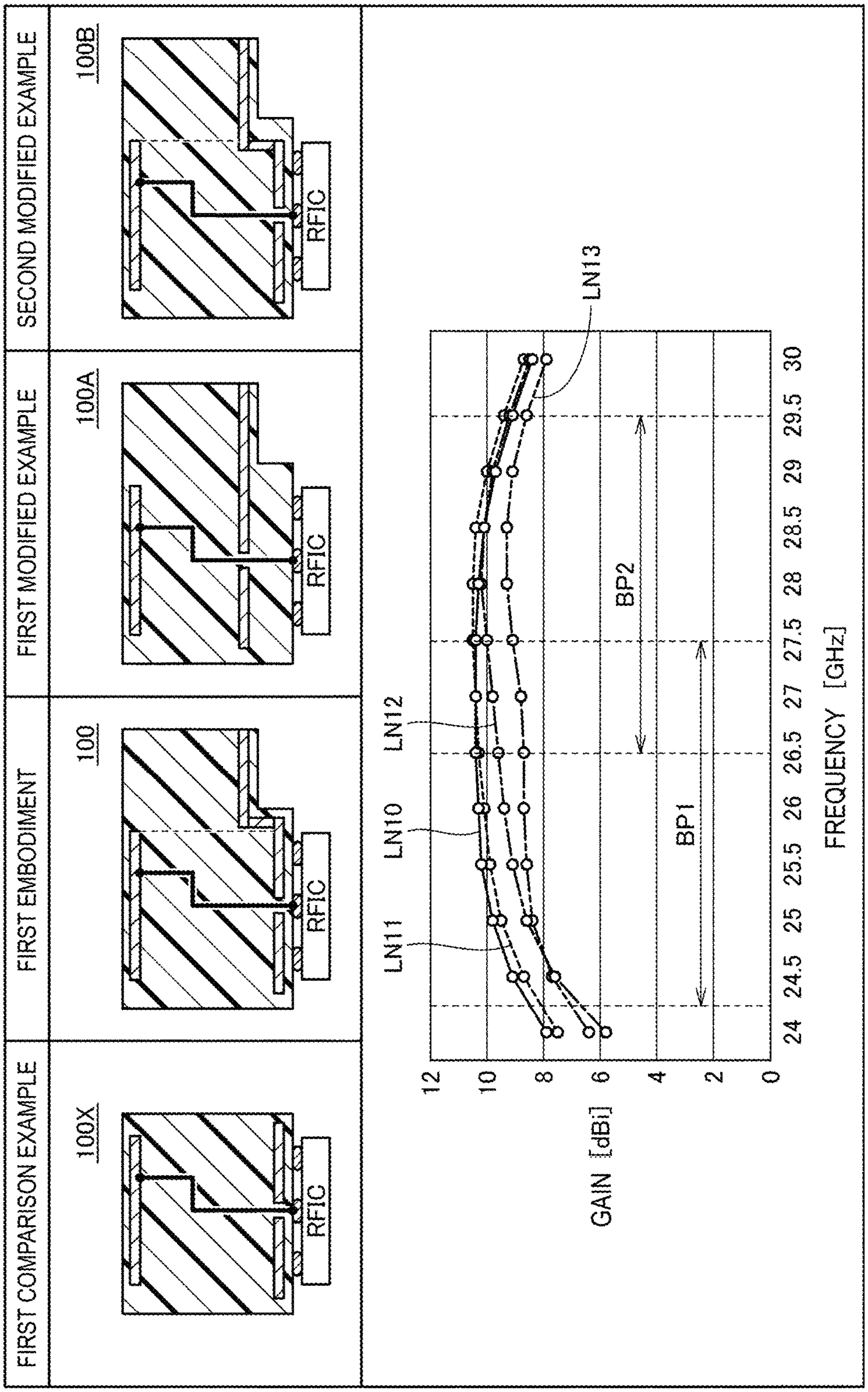
FIG. 7 is a diagram for describing the antenna gains of the antenna modules of the first comparison example, the first exemplary embodiment, and the first and second modified examples.

FIG. 7 is a diagram illustrating the antenna gains of the antenna modules according to the first comparison example, the first exemplary embodiment, and the first and second modified examples which are described above. In FIG. 7, the horizontal axis indicates frequency; the vertical axis indicates antenna gain. In the examples described above, the target frequency band of the antenna modules is the 28-GHz band; the antenna modules cover the frequency band BP1, from 24.25 GHz to 27.50 GHz, which is called n258, and the frequency band BP2, from 26.50 GHz to 29.50 GHz, which is called n257.

In FIG. 7, the antenna gain of the antenna module 100 according to the first exemplary embodiment is illustrated by using the solid line LN10; the antenna gain of the antenna module 100X according to the first comparison example is illustrated by using the chain double-dashed line LN13. The antenna gains of the first and second modified examples are illustrated by using the broken line LN11 and the alternate long and short dashed line LN12, respectively.

As illustrated in FIG. 7, it is found that, except for the part of 24.5 GHz or less of the antenna module 100B according to the second modified example, the first exemplary embodiment and the first and second modified examples achieve higher gains than that of the first comparison example.

Third Modified Example

Figure 8:
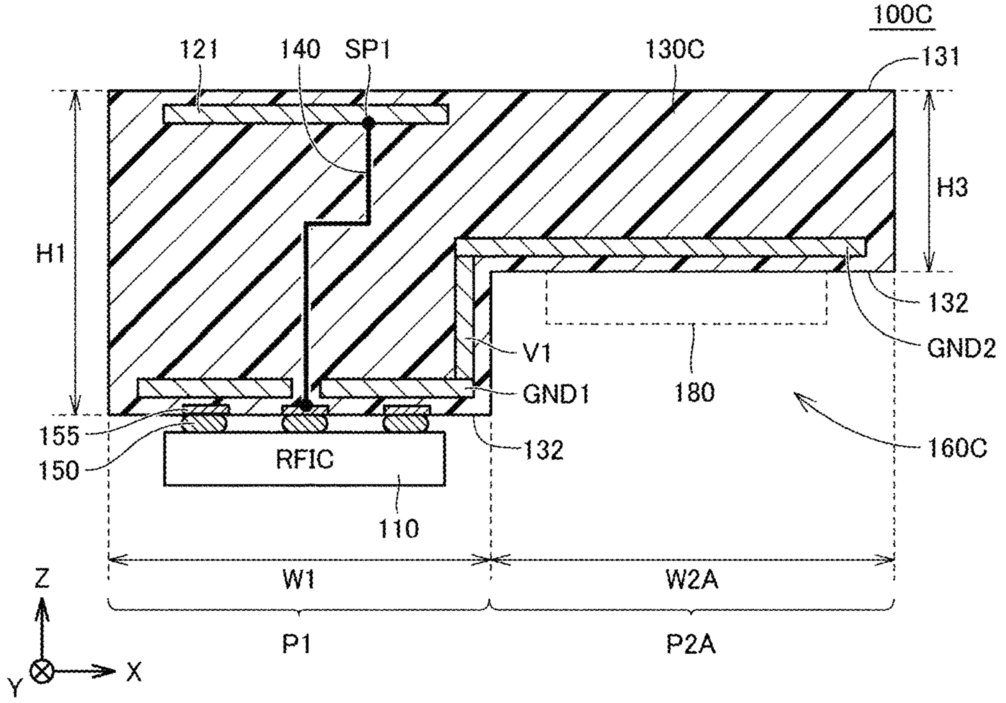
FIG. 8 is a cross-sectional perspective view of an antenna module according to a third modified example.

FIG. 8 is a cross-sectional perspective view of an antenna module 100C according to a third modified example. In the antenna module 100C, the dimension W2A, in the X-axis direction, of a second portion P2A of a dielectric substrate 130C is further larger than the antenna module 100 according to the first embodiment (W2A>W2). In this case, the area of the entire grounding electrodes relative to that of the radiating element 121 is larger. Thus, if a recess 160C has a shallow depth in the thickness direction, a large influence of thermal stress may be exerted even when the recess is formed, resulting in occurrence of warping.

Therefore, as in the antenna module 100C according to the third modified example, when the dimension of the second portion P2A of the dielectric substrate 130C is large, in some exemplary embodiments, the thickness of the second portion P2A may be made smaller (H3<H2). The smaller thickness of the second portion P2A causes a reduction of the difference in density of conductors (the radiating element and the grounding electrodes) in the thickness direction of the dielectric substrate 130C, achieving reduction of warping of the dielectric substrate 130C.

The grounding electrode GND2 may be disposed closer to the top surface 131 than the case of the antenna module 100, while the thickness of the second portion P2A is at the comparable level of that of the antenna module 100.

In addition, a connector 180 for connection to a mount board may be disposed in a portion, in the recess 160C, on the bottom surface 132 of the dielectric substrate 130C. Placement of the connector 180 in a portion in the recess 160C causes a reduction of the dimension, which includes the mount board, in the Z-axis direction. Alternatively, instead of or in addition to the connector 180, another component may be disposed in a portion on the bottom surface 132 in the recess 160C.

Fourth Modified Example

Figure 9:
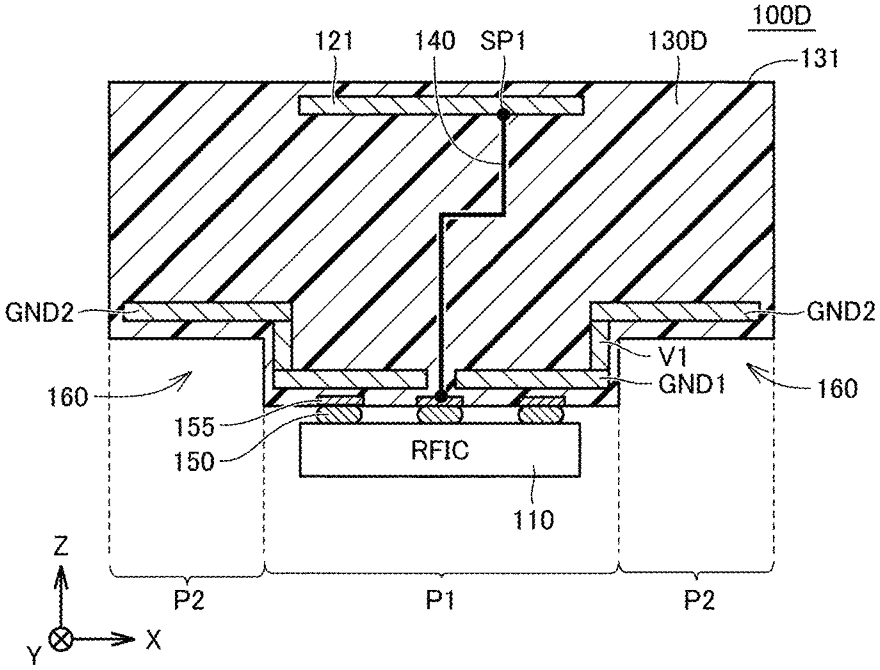
FIG. 9 is a cross-sectional perspective view of an antenna module according to a fourth modified example.

FIG. 9 is a cross-sectional perspective view of an antenna module 100D according to a fourth modified example. In the antenna module 100D, recesses 160 are formed on both sides of the first portion P1 of a dielectric substrate 130D (that is, in the positive direction and the negative direction of the X axis with respect to the first portion P1). Thus, in the dielectric substrate 130D, forming second portions P2 symmetrically with respect to the first portion P1 achieves adjustment of the beam direction (that is, the directivity) of radio waves radiated from the radiating element 121, in addition to prevention of occurrence of warping of the dielectric substrate 130D and suppression of a reduction of the antenna gain. Substantially the same configuration may be employed in the Y-axis direction.

Fifth Modified Example

Figure 10:
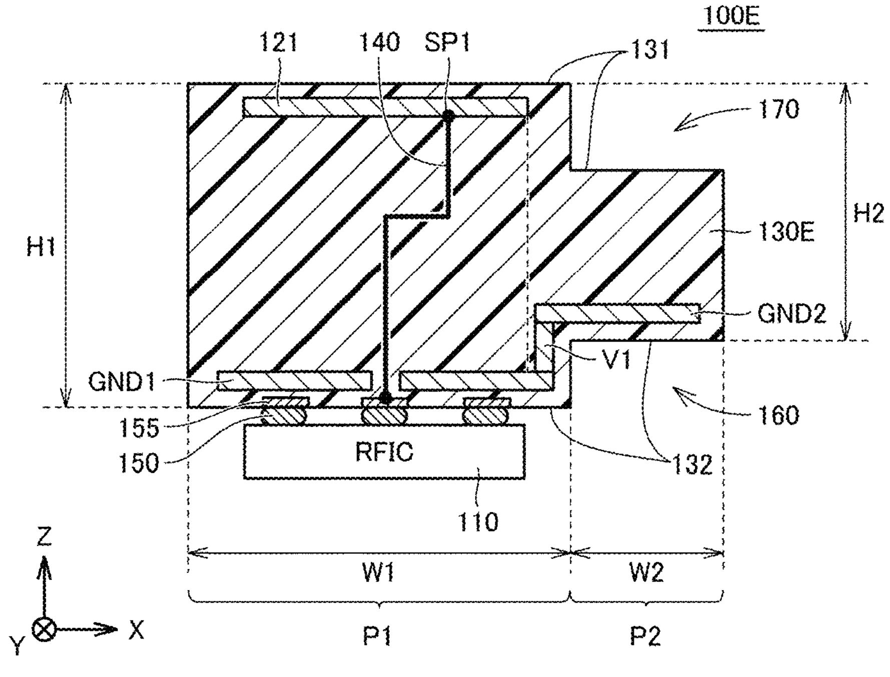
FIG. 10 is a cross-sectional perspective view of an antenna module according to a fifth modified example.

FIG. 10 is a cross-sectional perspective view of an antenna module 100E according to a fifth modified example. The antenna module 100E has a configuration in which the second portion P2 of the dielectric substrate 130E has a recess 170 formed on the top surface 131, in addition to the recess formed on the bottom surface 132 side. Such a configuration may be employed to make the thickness of the dielectric of the second portion P2 less than that of the first portion P1.

In the case of the antenna module 100E, the electric flux from the radiating element through the recess 170 to the grounding electrode GND2 passes through the dielectric layer, the air layer, and the dielectric layer in this sequence. Thus, unnecessary reflection may occur at the boundaries between the dielectric layers and the air layer. Therefore, it is desirable that employment of forming the recess 170 be determined in view of influence of the reflection.

Typically, the dielectric constant of an air layer is lower than that of a dielectric substrate. Thus, as in the antenna module 100E, the air layer, which is provided on the path through which the electric flux passes, achieves a reduction of the effective dielectric constant of the antenna module 100E. Therefore, the antenna module 100E achieves a frequency bandwidth wider than that of the antenna module 100 according to the first embodiment.

Second Embodiment

In the first exemplary embodiment, the example in which a single radiating element is disposed in the dielectric substrate is described. In a second exemplary embodiment, a configuration in which substantially the same feature as that of the first exemplary embodiment is applied to an array antenna having two different radiating surfaces will be described.

Figure 11:
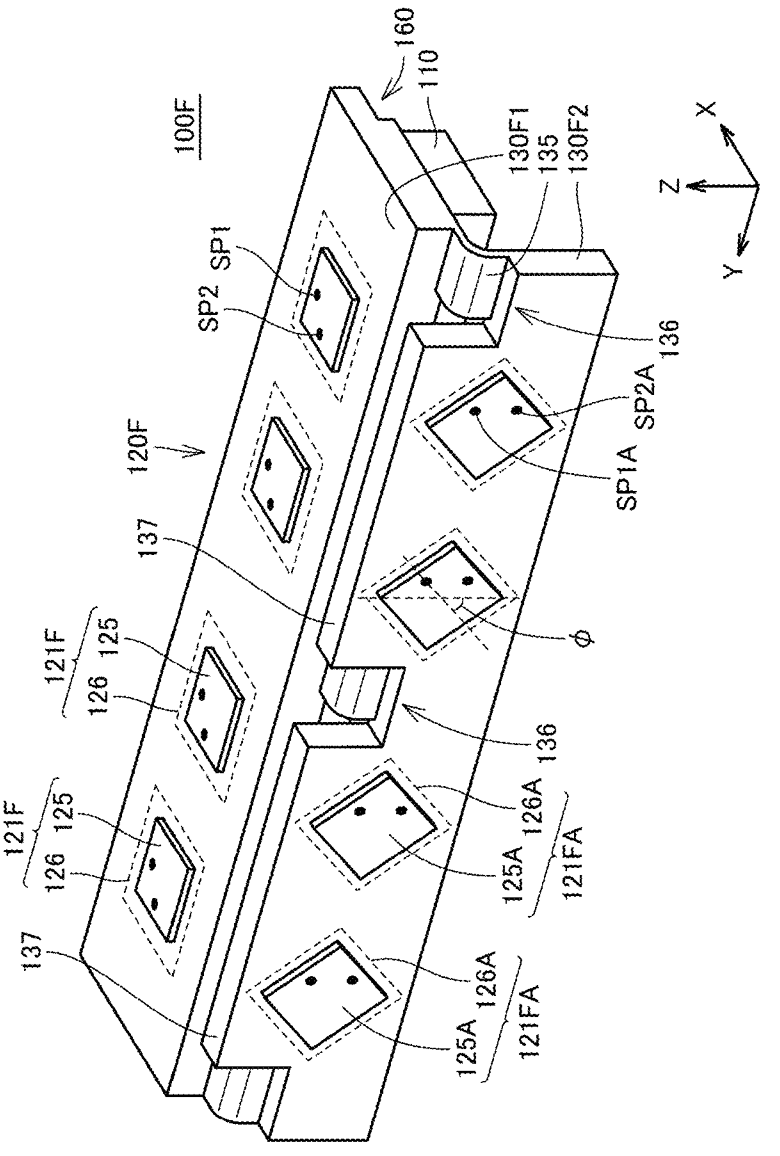
FIG. 11 is a perspective view of an antenna module according to a second exemplary embodiment.
Figure 12:
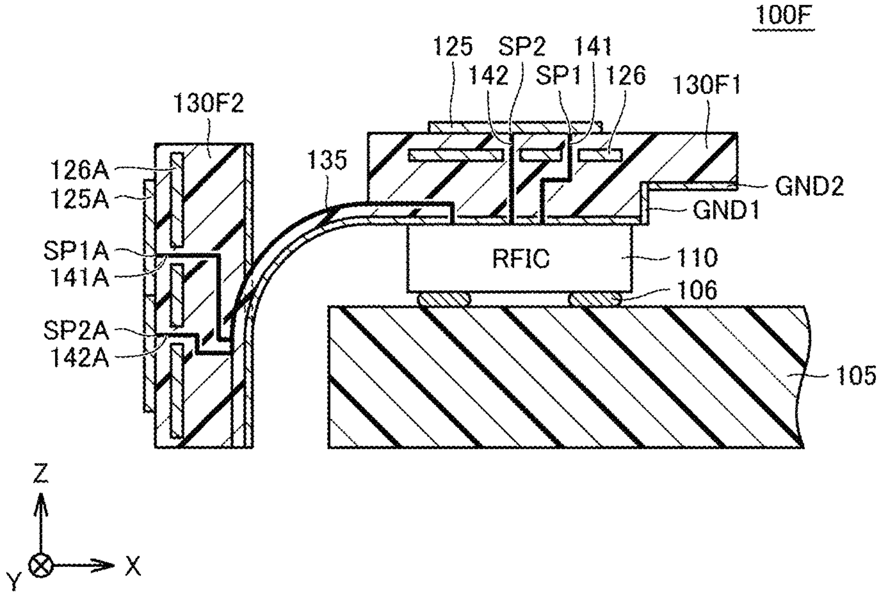
FIG. 12 is a cross-sectional perspective view of the antenna module in FIG. 11.

FIG. 11 is a perspective view of an antenna module 100F according to the second exemplary embodiment. FIG. 12 is a cross-sectional perspective view of the ZX plane including a bend 135 of the antenna module 100F.

Referring to FIGS. 11 and 12, an antenna device 120F of the antenna module 100F includes a dielectric substrate 130F1 and a dielectric substrate 130F2 which are connected to each other by using bends 135. The antenna device 120F has substantially an L-shape in cross section. The dielectric substrate 130F1 is formed so as to be shaped like a plate with the Z-axis direction used as the normal direction. The dielectric substrate 130F2 is formed so as to be shaped like a plate with the X-axis direction used as the normal direction.

In the antenna module 100F, four radiating elements are disposed in a line in the Y-axis direction on each of the two dielectric substrates 130F1 and 130F2. Each radiating element includes a feed element (first element) and a parasitic element (second element). In the description below, for ease of understanding, an arrangement example in which the feed elements are exposed on the surfaces of the dielectric substrates 130F1 and 130F2 will be described. The feed elements may be disposed inside the dielectric substrates 130F1 and 130F2 as one of ordinary skill will recognize.

The dielectric substrate 130F1 is substantially rectangular. The feed elements 125 of four radiating elements 121F are disposed in a line in the Y-axis direction on the surface of the dielectric substrate 130F1. The grounding electrode GND1 is disposed on the dielectric substrate 130F1 so as to face the feed elements 125. Parasitic elements 126 are disposed between the feed elements 125 and the grounding electrode GND1 so as to face the feed elements 125. Each of the feed elements 125 and the parasitic elements 126 is a rectangular patch antenna. Each side of the feed elements 125 and the parasitic elements 126 is disposed so as to be parallel to the corresponding side of the dielectric substrate 130F1.

The size of each parasitic element 126 is larger than that of the corresponding feed element 125. Therefore, the resonant frequency of each parasitic element 126 is lower than that of the corresponding feed element 125. The frequency band of radio waves radiated from each parasitic element 126 is lower than that from the corresponding feed element 125.

The RFIC 110 is connected on the bottom-surface side (the surface in the negative direction of the Z axis) of the dielectric substrate 130F1. The RFIC 110 is mounted on a mount board 105 with solder bumps 106 interposed in between. Instead of connection using solder, the RFIC 110 may be mounted on the mount board 105 by using a multipolar connector.

Like the first exemplary embodiment, the dielectric substrate 130F1 has the recess 160 formed in a portion (second portion) in which the radiating elements 121F and the RFIC 110 are not disposed. The grounding electrode GND2 is disposed in the second portion, and is electrically connected to the grounding electrode GND1.

The feed elements 125 are supplied with radio-frequency signals from the RFIC 110 through feed wires 141 and 142. The feed wires 141 and 142, which extend from the RFIC 110 through the grounding electrode GND1 and the parasitic elements 126, are connected to feed points SP1 and SP2, respectively, of the feed elements 125.

The feed points SP1 are disposed at positions offset from the centers of the respective feed elements 125 in the positive direction of the X axis. Therefore, supply of the feed points SP1 with radio-frequency signals having a frequency corresponding to the feed elements 125 causes radio waves, whose polarization direction is the X-axis direction, to be radiated from the feed elements 125. The feed points SP2 are disposed at positions offset from the centers of the respective feed elements 125 in the positive direction of the Y axis. Therefore, supply of the feed points SP2 supplied with radio-frequency signals having a frequency corresponding to the feed elements 125 causes radio waves, whose polarization direction is the Y-axis direction, to be radiated from the feed elements 125.

Supply of the feed points SP1 with radio-frequency signals having a frequency corresponding to the parasitic elements 126 causes radio waves, whose polarization direction is the X-axis direction, to be radiated from the parasitic elements 126. Supply of the feed points SP2 with radio-frequency signals having a frequency corresponding to the parasitic elements 126 causes radio waves, whose polarization direction is the Y-axis direction, to be radiated from the parasitic elements 126.

That is, the antenna module 100F is a so-called dual-polarization, dual-band antenna module.

The dielectric substrate 130F2 is shaped like a plate. The feed elements 125A of four radiating elements 121FA are disposed in a line in the Y-axis direction on the surface of the dielectric substrate 130F2. As described above, the dielectric substrate 130F2 is connected to the dielectric substrate 130F1 through the bends 135. In the dielectric substrate 130F2, notches 136 are formed in portions to which the bends 135 are connected. In the dielectric substrate 130F2, protrusions 137 are formed in portions in which the notches 136 are not formed. The protrusions 137 protrude from boundary portions, in which the bends 135 are connected to the dielectric substrate 130F2, in the direction, which extends along the dielectric substrate 130F2 toward the dielectric substrate 130F1 (that is, the positive direction of the Z axis).

The grounding electrode GND1 is disposed in a layer on the back surface side of the dielectric substrate 130F2 (the side in the positive direction of the X axis in FIG. 12). The grounding electrode GND1 extends from the dielectric substrate 130F1 through the bends 135 to the dielectric substrate 130F2. Similarly, in the dielectric substrate 130F2, parasitic elements 126A are disposed between the feed elements 125A and the grounding electrode GND1 so as to face the feed elements 125A.

Each of the feed elements 125A and the parasitic elements 126A is a rectangular patch antenna. Each side of the feed elements 125A and the parasitic elements 126A is disposed so as to be inclined with respect to the corresponding side of the dielectric substrate 130F2.

The feed elements 125A are supplied with radio-frequency signals from the RFIC 110 through feed wires 141A and 142A. The feed wires 141A and 142A, which extend from the RFIC 110 through the grounding electrode GND1 via the bends 135 and further extend through the parasitic elements 126A, are connected to the feed points SP1A and SP2A, respectively, of the feed elements 125A. The feed points SP1A are disposed at positions offset from the centers of the feed elements 125A in a first direction having an angle $\varphi$ ($0° < \varphi < 90°$) with respect to the Z axis. The feed points SP2A are disposed at positions offset from the centers of the feed elements 125A in a second direction orthogonal to the first direction.

Therefore, supply of the feed points SP1A with radio-frequency signals having a frequency corresponding to the feed elements 125A causes radio waves, whose polarization direction is the first direction, to be radiated from the feed elements 125A. Supply of the feed points SP2A with radio-frequency signals having a frequency corresponding to the feed elements 125A causes radio waves, whose polarization direction is the second direction, to be radiated from the feed elements 125A. Supply of the feed points SP1A with radio-frequency signals having a frequency corresponding to the parasitic elements 126A causes radio waves, whose polarization direction is the first direction, to be radiated from the parasitic elements 126A. Supply of the feed points SP2A with radio-frequency signals having a frequency corresponding to the parasitic elements 126A causes radio waves, whose polarization direction is the second direction, to be radiated from the parasitic elements 126A.

Similarly, in the antenna module 100F having the configuration described above, the dielectric substrate 130F1 has a configuration in which the second portion, in which the radiating elements 121F are not disposed, has a thickness less than that of the first portion in which the radiating elements 121F are disposed; the grounding electrode GND2 is disposed in an inner layer of the second portion. Therefore, while occurrence of warping of the dielectric substrate 130F1 is prevented, suppression of a reduction of the antenna gain is achieved.

Each of the "feed elements 125 and 125A" in the second exemplary embodiment corresponds to "first element" in the present disclosure. Each of the "parasitic elements 126 and 126A" in the second exemplary embodiment corresponds to "second element" in the present disclosure. "Dielectric substrate 130F1" and "dielectric substrate 130F2" in the second exemplary embodiment correspond to "first dielectric substrate" and "second dielectric substrate", respectively, in the present disclosure. Any one of the radiating elements 121F in the second exemplary embodiment corresponds to "first radiating element" in the present disclosure; another radiating element 121F disposed adjacent to the radiating element 121F corresponds to "second radiating element" in the present disclosure.

Sixth Modified Example

Figure 13:
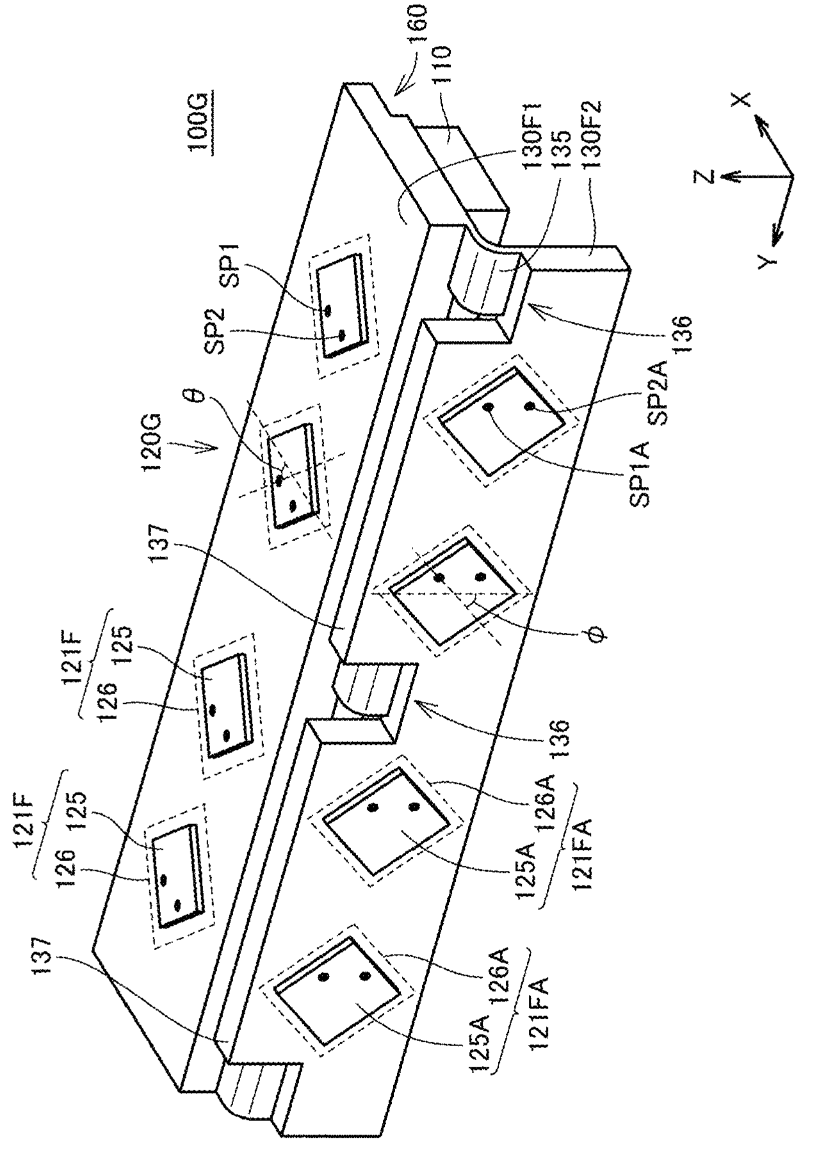
FIG. 13 is a perspective view of an antenna module according to a sixth modified example.
Figure 14:
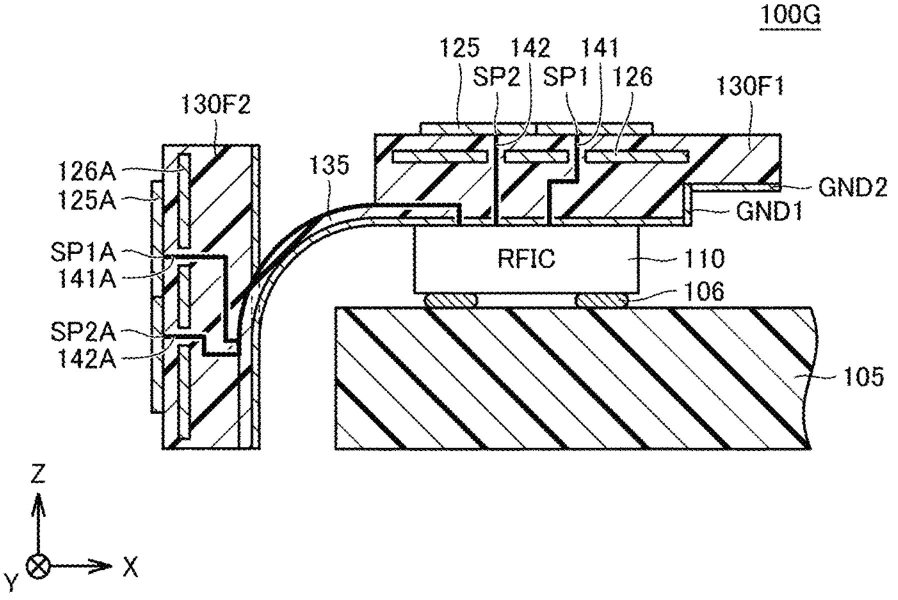
FIG. 14 is a cross-sectional perspective view of the antenna module in FIG. 13.

FIG. 13 is a perspective view of an antenna module 100G according to a sixth modified example. FIG. 14 is a cross-sectional perspective view in the ZX plane including a bend 135 of the antenna module 100G. The antenna module 100G is different from the antenna module 100F, which is described in FIGS. 11 and 12, in that each side of the radiating elements 121F disposed on the dielectric substrate 130F1 is inclined with respect to the corresponding side of the dielectric substrate 130F1. In FIGS. 13 and 14, the other configurations are substantially the same as those of the antenna module 100F according to the second exemplary embodiment, and common components will not be described repeatedly.

Referring to FIGS. 13 and 14, in an antenna device 120G of the antenna module 100G, each radiating element 121F is disposed so that the angle $\theta$ of the X-axis direction with respect to the direction of a virtual line, which connects the center of the corresponding feed element 125 to the corresponding feed point SP1, satisfies $0° < \theta < 90°$.

In the dielectric substrate 130F1, the second portion, in which the radiating elements 121F are not disposed, has a thickness less than that of the first portion in which the radiating elements 121F are disposed; the grounding electrode GND2 is disposed in an inner layer of the second portion. Therefore, while occurrence of warping of the dielectric substrate 130F1 is prevented, suppression of a reduction of the antenna gain is achieved.

Seventh Modified Example

Figure 15:
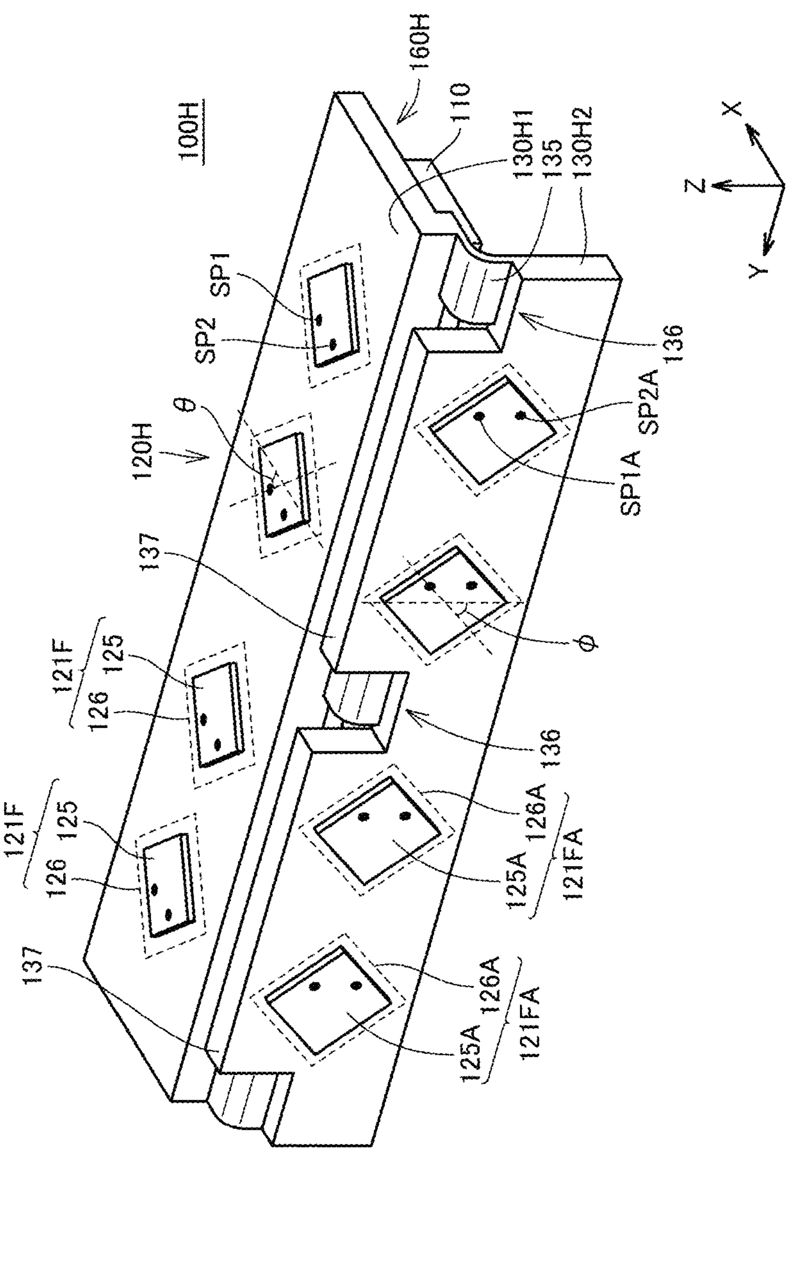
FIG. 15 is a perspective view of an antenna module according to a seventh modified example.

FIG. 15 is a perspective view of an antenna module 100H according to a seventh modified example. The antenna module 100H has an antenna device 120H having a configuration in which the dielectric substrates 130F1 and 130F2 in the antenna module 100G according to the sixth modified example are replaced with dielectric substrates 130H1 and 130H2. In the antenna module 100H, the other portions are substantially the same as those in the antenna module 100G, and repeated description about such components will be avoided.

In the antenna module 100G, the recess 160 is formed along the end portion on the long side, along the Y axis, of the dielectric substrate 130F1. In the antenna module 100H, a recess 160H is formed in a portion, in which the radiating elements 121 are not disposed, along the end portion on the short side, along the X axis, of the dielectric substrate 130H1. In the dielectric substrate 130H1, the grounding electrode GND2 is disposed in an inner layer of the second portion which is thin and in which the recess 160H is formed (not illustrated in FIG. 15). Therefore, while occurrence of warping of the dielectric substrate 130H1 is prevented, suppression of a reduction of the antenna gain is achieved.

In addition to the end portion on the short side of the dielectric substrate 130H1, a recess may be formed along the end portion on the long side of the dielectric substrate 130H1 as in the sixth modified example.

The exemplary embodiments disclosed in the specification are to be considered to be illustrative and not restrictive in all respects. It is intended that the scope of the present disclosure is set forth in the claims, not in the description of the exemplary embodiments described above, and that all variations within the meaning and scope of the claims and their equivalents are encompassed.

REFERENCE SIGNS LIST

10 communication device
100, 100A to 100H, 100X, 100Y antenna module
105 mount board

106, 150 solder bump
110 RFIC
111A to 111D, 113A to 113D, 117 switch
112AR to 112DR low-noise amplifier
112AT to 112DT power amplifier
114A to 114D attenuator
115A to 115D phase shifter
116 signal combiner/splitter
118 mixer
119 amplifier circuit
120, 120F, 120G, 120H antenna device
121, 121F, 121FA radiating element
125, 125A feed element
126, 126A parasitic element
130, 130C to 130E, 130F1, 130F2, 130H1, 130H2, 130X, 130Y dielectric substrate
131 top surface
132 bottom surface
135 bend
136 notch
137 protrusion
140, 141, 141A, 142, 142A feed wire
155 connection terminal
160, 160C, 160H, 170 recess
180 connector
200 BBIC
GND1, GND1A, GND1Y, GND2, GND2A grounding electrode
P1 first portion
P2, P2A second portion
SP1, SP1A, SP2A, SP2 feed point
V1 via

The invention claimed is:

1. An antenna module comprising:

a first dielectric substrate that has a first surface facing a second surface and that includes a plate-shaped first portion and a plate-shaped second portion, the second portion having a thickness less than the first portion;

a first radiating element that is included in the first portion;

a first grounding electrode that is disposed only within the first portion at a position located apart from the first radiating element in a direction from the first radiating element to the second surface, the first grounding electrode facing the first radiating element, and a second grounding electrode that is disposed between the first surface and the second surface in the second portion and that is electrically connected to the first grounding electrode, wherein the second surface in an area of the second portion includes a recess disposed at an end of the first dielectric substrate, the first portion has a width greater than a width of the second portion in a first direction, the first direction extending from the first portion to the second portion in a cross sectional view, and in the cross sectional view, the second portion is disposed on a side of the first portion opposite to a side of the first portion on which a bend portion is disposed.

2. The antenna module according to claim 1, wherein the second grounding electrode is positioned at an identical position to the first grounding electrode in a thickness direction of the first dielectric substrate.

3. The antenna module according to claim 1, wherein the second grounding electrode is disposed at a position between the first surface and the first grounding electrode in a thickness direction of the first dielectric substrate, and wherein the antenna module further comprises a via conductor that connects the first grounding electrode to the second grounding electrode.

4. The antenna module according to claim 3, wherein, in a case that the first dielectric substrate is viewed in plan in a normal direction, the second grounding electrode does not overlap the first radiating element.

5. The antenna module according to claim 3, wherein, in a case that the first dielectric substrate is viewed in plan in a normal direction, a part of the second grounding electrode overlaps the first radiating element.

6. The antenna module according to claim 1, wherein the first radiating element includes a first element configured to radiate a radio wave in a first frequency band, and a second element that is disposed between the first element and the first grounding electrode and that is configured to radiate a radio wave in a second frequency band lower than the first frequency band.

7. The antenna module according to claim 1, wherein the first radiating element is configured to radiate radio waves having two different polarization directions.

8. The antenna module according to claim 1, further comprising:

a second radiating element that is disposed adjacent to the first radiating element in the first portion, in a case that the first dielectric substrate is viewed in plan in a normal direction.

9. The antenna module according to claim 1, wherein the first dielectric substrate is rectangular in plan view in a normal direction, wherein the first radiating element includes a plate-shaped, rectangular electrode, and wherein, in a case that an angle of a side of the first dielectric substrate with respect to a side of the first radiating element is assumed to be θ, 0°<θ 90°.

10. The antenna module according to claim 1, further comprising:

a second dielectric substrate; and a third radiating element that is included in the second dielectric substrate, wherein a direction normal to the second dielectric substrate is different from a direction normal to the first dielectric substrate.

11. The antenna module according to claim 1, further comprising:

a connection terminal to connect an external device, the connection terminal being disposed on the second surface of the first portion.

12. The antenna module according to claim 11, further comprising:

a feed circuit that is connected to the connection terminal and that is configured to supply a radio-frequency signal to the first radiating element.

13. The antenna module according to claim 1, wherein the first surface does not have a recess.

14. The antenna module according to claim 1, wherein the first dielectric substrate has a first edge and a second edge which is shorter than the first edge, and the first edge has the end.

15. The antenna module according to claim 1, wherein the first dielectric substrate has a first edge and a second edge which is shorter than the first edge, and the second edge has the end.

16. A communication device comprising:

the antenna module according to claim 1.

17. The communication device according to claim 16, further comprising:

a base band integrated circuit (BBC); and a radio frequency integrated circuit (RFIC), wherein the RFIC is configured to upconvert signals from the BBC and to provide the upconverted signals to the antenna module for transmission.

18. The communication device according to claim 17, wherein the RFIC is configured to downconvert signals received by the antenna module and to provide the downconverted signals to the BBC for processing.

19. The communication device according to claim 18, further comprising at least one switch to switch connection between the RFIC and the antenna module from a transmit side connection to a receive side connection.

* * * * *